United States Patent [19]

Sabatella et al.

[11] Patent Number: 4,945,450
[45] Date of Patent: Jul. 31, 1990

[54] MODULAR ELECTRIC SWITCH-CIRCUIT BREAKER ASSEMBLY

[75] Inventors: Robert J. Sabatella, Southington; Joseph J. Mrowka; Jon P. McCuin, both of Bristol; Dean A. Robarge, New Britain; Denis A. Perzan, Plainville; Robert G. Markowski, East Haven; David A. Reid, Forestville, all of Conn.

[73] Assignee: General Electric Company, New York, N.Y.

[21] Appl. No.: 388,467

[22] Filed: Aug. 2, 1989

[51] Int. Cl.$^5$ .............................................. H02B 1/04
[52] U.S. Cl. .................................... 361/334; 361/339; 361/342; 361/391; 439/212; 439/839
[58] Field of Search ............... 439/212, 213, 214, 723, 439/839; 361/334–339, 342, 343, 353–356, 358, 361, 376, 379, 391, 392; 307/147, 148

[56] References Cited

U.S. PATENT DOCUMENTS

| | | | |
|---|---|---|---|
| 3,087,039 | 4/1963 | Bachman | 439/212 |
| 3,142,003 | 7/1964 | Olashaw | 439/212 |
| 3,343,042 | 9/1967 | Cellerini | 361/339 |
| 4,305,114 | 12/1981 | Takagi | 361/339 |
| 4,553,799 | 11/1985 | Peters | 439/839 |
| 4,752,233 | 6/1988 | Morby et al. | 439/212 |
| 4,782,427 | 11/1988 | Marks | 361/356 |

FOREIGN PATENT DOCUMENTS 3544227  6/1987  United Kingdom ................ 361/339

Primary Examiner—Gerald P. Tolin
Attorney, Agent, or Firm—Richard A. Menelly; Walter C. Bernkopf; Fred Jacob

[57] ABSTRACT

A multi-component electric switch-circuit breaker module permits electric switches and circuit breakers to be field-installed within existing panelboard-switchboard enclosures. The module contains a pair of compartments that are accessed by separate doors. Electric switches or circuit breakers can be arranged within both compartments or an electric switch can be installed within one compartment with an electric circuit breaker installed within the other. The module is removably attached to the panelboard-switchboard interior by means of a bail handle arrangement. The module is removed from the assembly by unscrewing the bail handle and manually accessing the module. Spring-loaded connector clips allow for repeated connection with and disconnection from the systems power bus with minimum contact resistance.

27 Claims, 8 Drawing Sheets

MODULAR ELECTRIC SWITCH-CIRCUIT BREAKER ASSEMBLY

BACKGROUND OF THE INVENTION

U.S. Pat. application Ser. No. (388452 filed 8/2/90,) which Application is incorporated herein for purposes of reference, describes a combination panelboard-switchboard enclosure that accepts a multi-component electric switch-circuit breaker module. The module differs from Prior Art arrangements wherein the electric switches are directly connected with the panelboard and switchboard power bus conductors whereas the module interconnects through an adapter base assembly. The removable feature of the module allows for the exchange and addition of electric switches and circuit breakers within switchboards and panelboards without requiring prolonged electrical shut-down.

Since the module enclosure presents an added expense to the panelboard-switchboard assembly, it is important that the module be economically assembled. The module is designed with means to prevent inadvertent or malicious removal from energized panelboard-switchboard enclosures.

One purpose of this invention is to provide an economically assembled module enclosure that can be secured to the panelboard-switchboard assembly to prevent unauthorized removal. A further purpose of this disclosure is to describe a spring-loaded connector clip arrangement that allows multiple connection with the electric power distribution power bus with no measurable increase in contact resistance.

SUMMARY OF THE INVENTION

A panelboard-switchboard enclosure is designed for accepting a multi-component electric switch-circuit breaker module that is economically assembled from a minimum number of component parts. A low contact resistance connector clip includes inner and outer contact assemblies joined by a pair of saddle-shaped contact springs. Mechanical and electric ground connection is made between the multi-component module and the panelboard-switchboard assembly by a latch arrangement that is accessed by a secured bail handle.

DESCRIPTION OF THE PREFERRED EMBODIMENT

Before describing the Preferred Embodiment, it is helpful to review the description of an "electric switchboard" and an "electric panelboard". For purposes of this disclosure, a "switchboard" is defined as "a self-standing array of circuit interruption devices rated up to a particular ampere value". A "panelboard" is defined as "a wall mounted device that includes an array of circuit interruption devices up to a rating less than that of a switchboard". A switchboard can comprise a plurality of individual panelboards mounted within a common self-standing enclosure.

Figure 1:
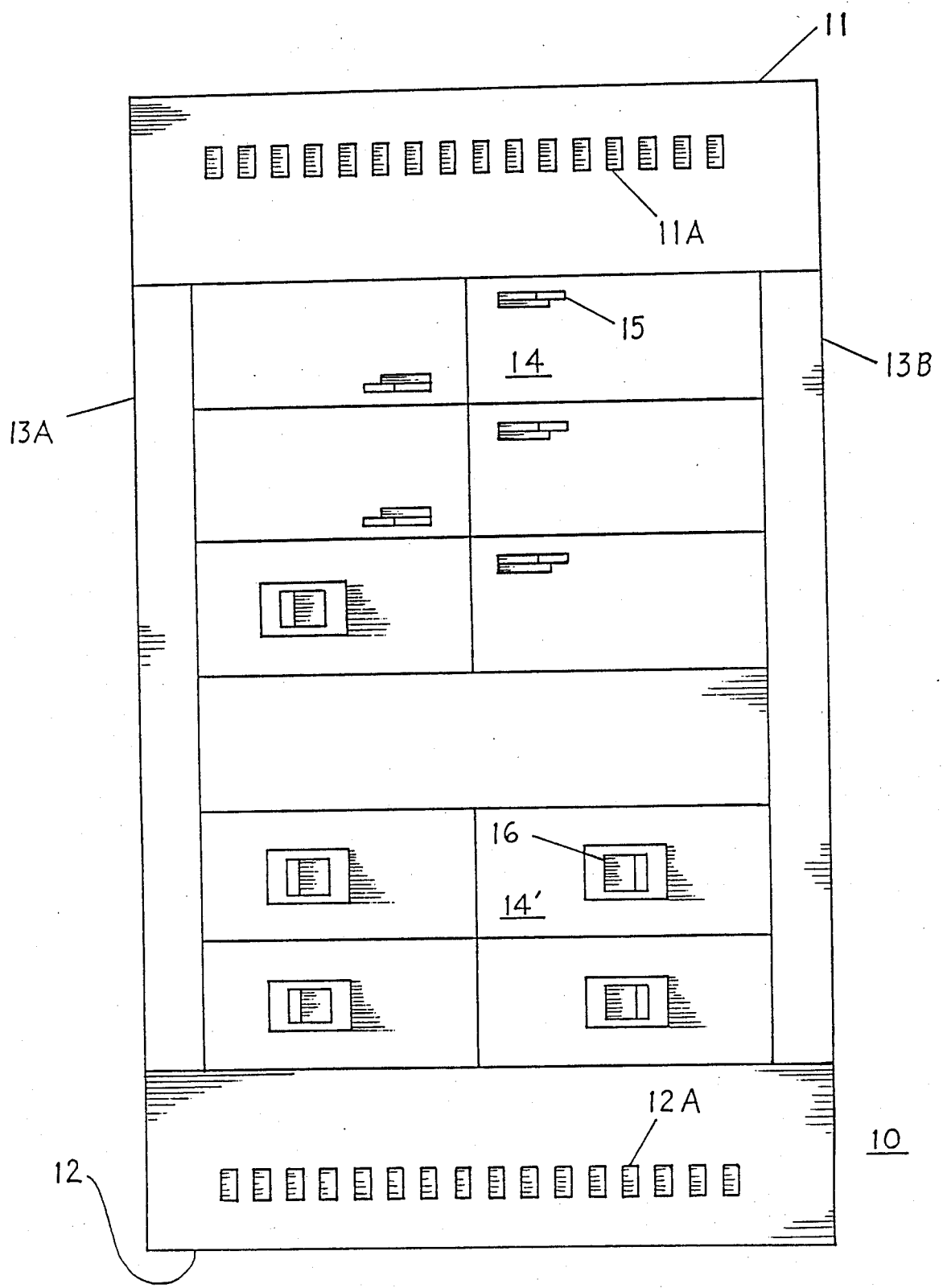
FIG. 1 is a front view of a combination panel-board-switchboard containing the electric switch-circuit breaker module according to the invention.

The panelboard-switchboard housing 10 of FIG. 1 (hereafter "housing") covers a wide range of circuit interruption devices which are attached to the housing by means of an electric switch-circuit breaker module 14 (hereafter "module"). The module can contain a pair of electric switches as indicated by the electric switch operating handles 15 or a pair of circuit breakers, as indicated by the circuit breaker operating handles 16 shown within module 14. The module can also contain an electric switch and a circuit breaker within the same enclosure, if so desired. In accordance with the requirement that a "switchboard" be self-standing, the housing further comprises a top 11, and a bottom 12 joined by opposing sidepieces 13A, 13B as indicated. The interior of the housing is thermally controlled by means of the top and bottom thermal control air vents 11A, 12A.

Figure 2:
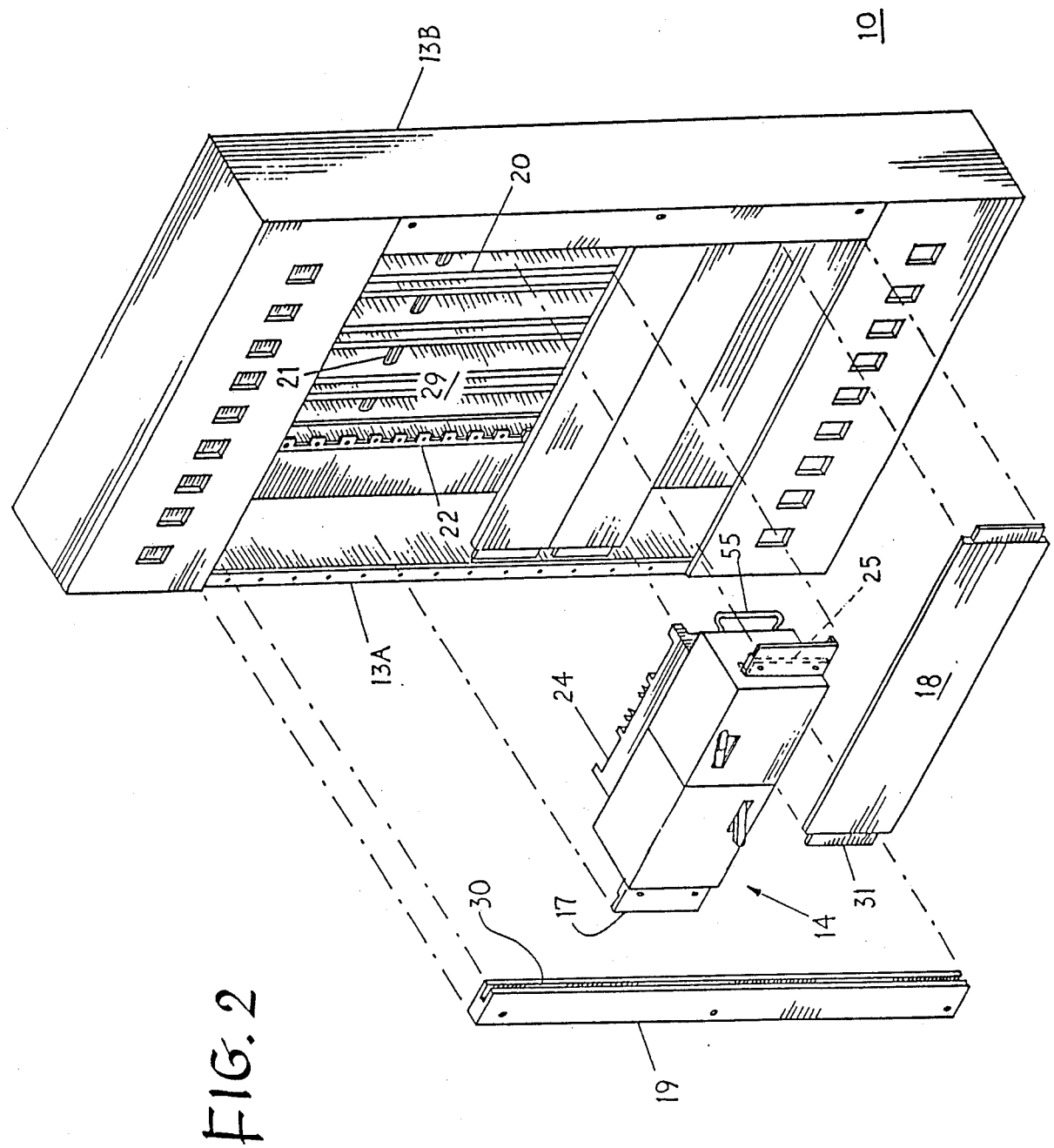
FIG. 2 is a front perspective view of the panelboard-switchboard enclosure of FIG. 1 with the electric switch-circuit breaker module in isometric projection.

The attachment between the module 14 and the housing 10 is best seen by referring now to FIG. 2 wherein the interior 29 includes vertically arranged bus bars 20 edge-mounted for stab-on connection with the base 24 attached to the bottom of the module 14. As described within the aforementioned U.S. Patent Application the bus bars are supported within the interior by means of an elongated insulative bolt 21 arranged between a pair of Z-shaped rails 22. A pair of bail handles 55 arranged on opposite sides of the module allow for placing the module into and removing the module from the interior. The module further includes a pair of adapter plates 17 which attach to corresponding tabs 25 and which engage the channel 30 extending along each of a pair of trim plates 19 that are attached to the sides 13A, 13B of the housing. The channel 30 also receives the tab 31 extending along the side of a rectangular filler plate 18 to cover the portion of the interior that does not contain a module. The channel can also receive the tab 25 when the module extends completely across the front of the housing and the adapter plates are not required.

Figure 3:
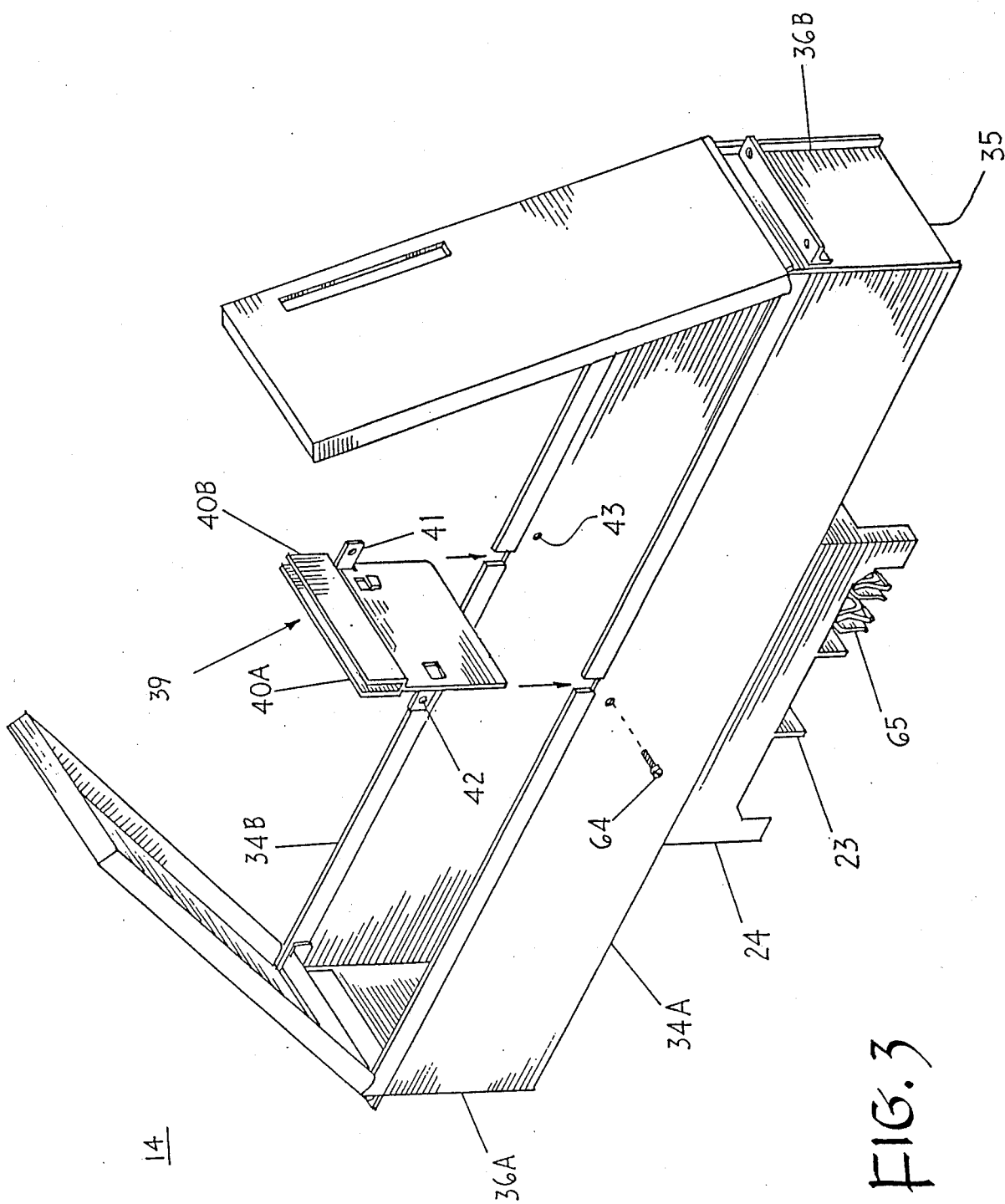
FIG. 3 is a top perspective view of the electric switch-circuit breaker module of FIG. 2 with the compartment separator in isometric projection.
Figure 4:
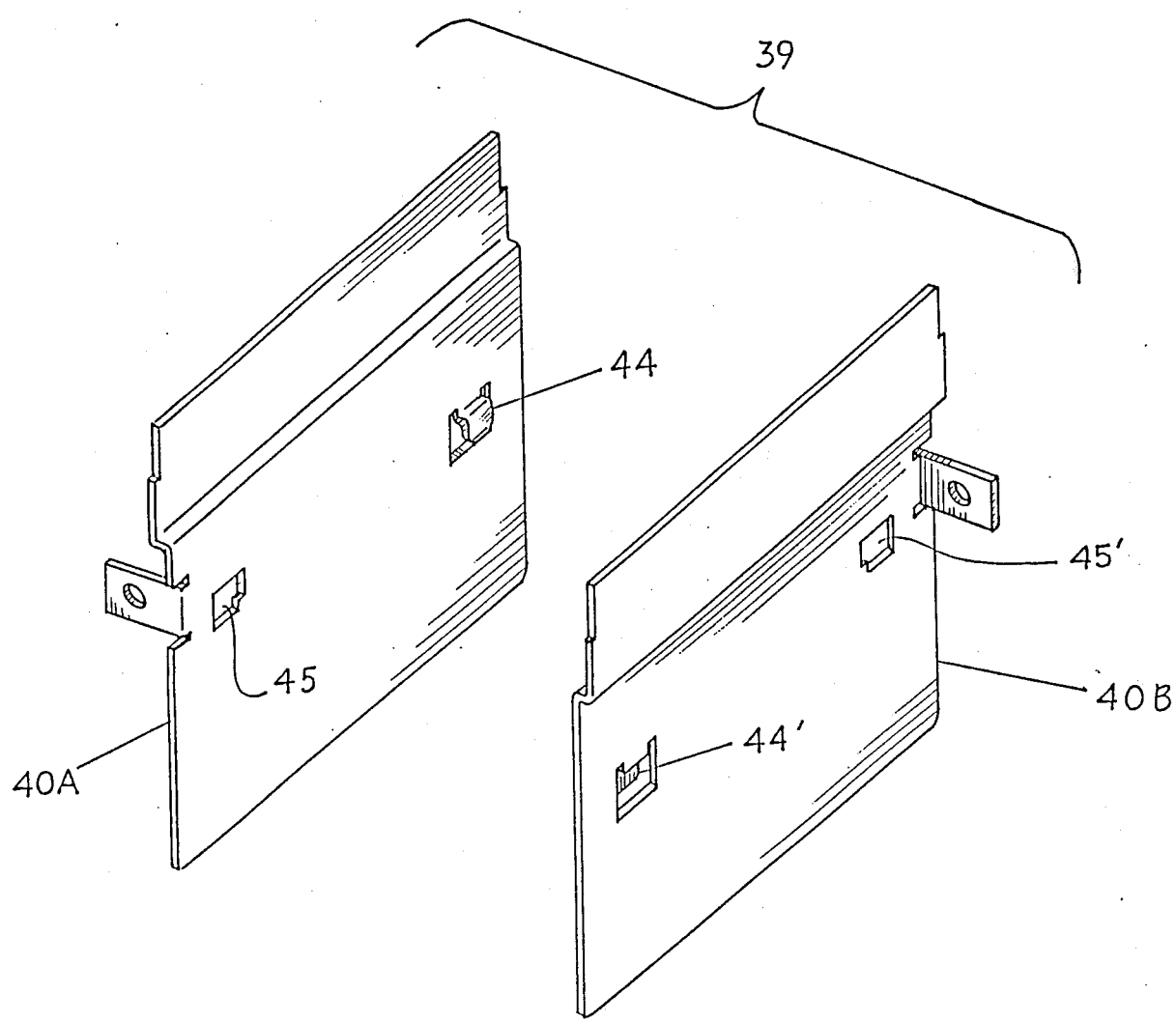
FIG. 4 is a front perspective view of the compartment separator of FIG. 3 prior to assembly.

The module 14 is depicted in FIG. 3 prior to assembling the electric switch or circuit breaker and is formed of a pair of opposing sidepieces 34A, 34B and opposing endpieces 36A, 36B joined by a bottom 35. A pair of thru-holes 43 are formed in the sidepieces for attaching a compartment separator 39 by means of attachment tabs 41 on the ends of the compartment separator, which contain threaded openings 42. A pair of screws 64 are arranged through the thru-holes 43 into threaded engagement with the tabs. The insulative base 24 is shown attached to the bottom of the module and arranged such that the connector clips 65 extend downwardly between the integrally-formed isolation barriers 23. The base is more fully described within U.S. Pat. No. 4,752,233 which Patent is incorporated herein for reference purposes and should be reviewed for its association with the electric switch or circuit breaker connected within the module described therein. The compartment separator 39 includes a pair of off-set plates 40A, 40B that are fastened together in the manner best seen by referring now to FIG. 4. The off-set plates 40A, 40B are identical pieces that are arranged facing each other such that the lanced tab 44 on off-set plate 40A extends through a complimentary slot 45' formed within off-set plate 40B while at the same time the lanced tab 44' on off-set plate 40B extends through the complimentary slot 45 in off-set plate 40A for a tight fit connection between the two off-set plates.

Figure 5:
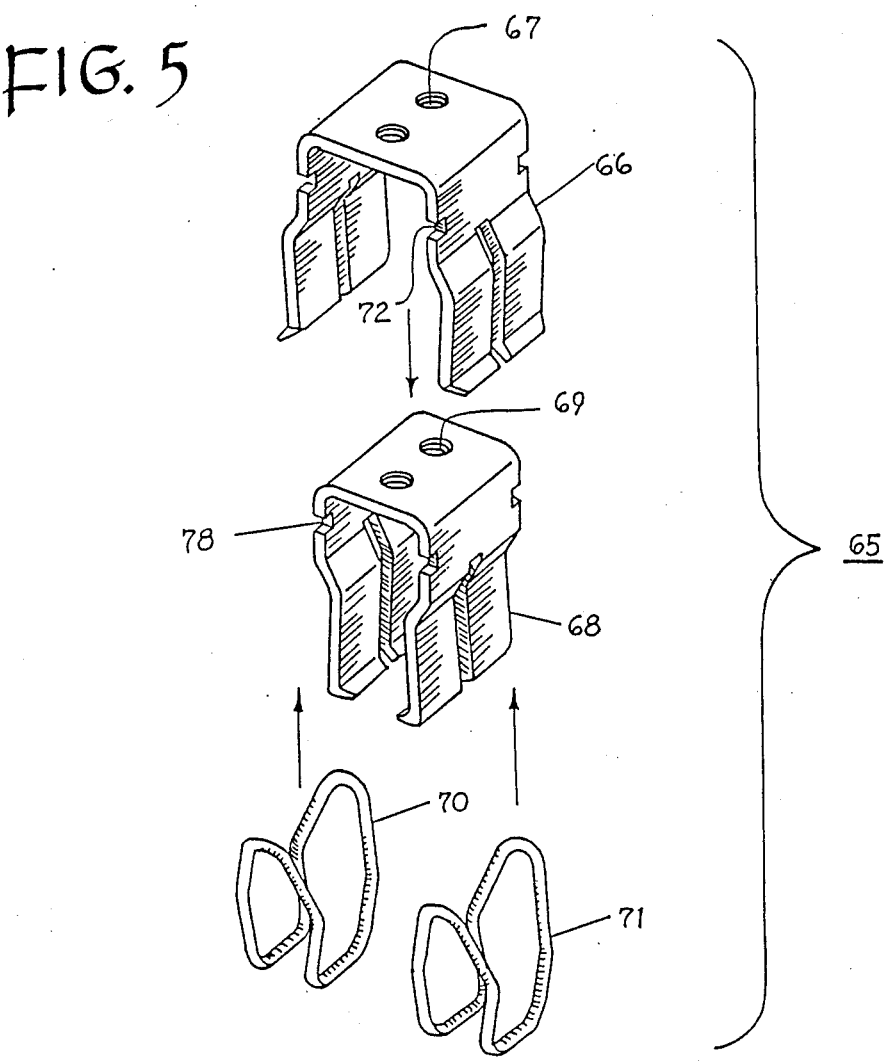
FIG. 5 is a top perspective view of the connector clip used with the electric switch-circuit breaker module of FIG. 2 prior to assembly.
Figure 6:
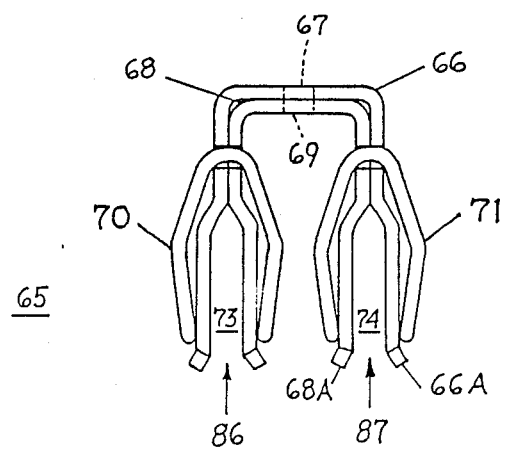
FIG. 6 is a front view of the connector clip of FIG. 5 after, assembly.

The connector clip 65 is shown in FIGS. 5 and 6 to consist of an outer U-shaped clip 66 having a pair of thru-holes 67 formed through a top thereof and four opposing slots such as indicated at 72 on opposing surfaces thereof. An inner clip 68, having the same configuration as the outer clip, is smaller than the outer clip and includes a corresponding pair of thru-holes 69 through a top surface thereof. A pair of similar slots 78 are formed on opposing front and rear surfaces for accepting a pair of saddle-shaped springs 70, 71 to hold the inner and outer clips in cooperation with the slots 72, 78 as shown in FIG. 6 wherein the thru-holes 67 formed within the outer clip 66 align with the thru-holes 69 formed on the inner clip 68 such that the off-set legs 66A on the outer clip cooperate with the off-set legs 68A on the inner clip to define a pair of stab receiving spaces 73, 74 within corresponding contacts 86, 87, as indicated in FIG. 6. These stab receiving spaces serve to capture the edge-mounted bus conductors 20 described earlier with reference to FIG. 2. When a single bus bar is employed, such as with lower-rated interiors, only one of the contacts 86, 87 connects with the single bus bar. When a pair of bus bars are employed with higher-rated interiors, both contacts 86, 87 connect with the bus bar pair. The saddle springs 70, 71 insure good electrical connection between the connector clips and the bus bars over long periods of extended use by maintaining constant contact pressure and thereby reduce the heat that would otherwise be generated by the contact resistance that occurs with other connector clip configurations.

Figure 7:
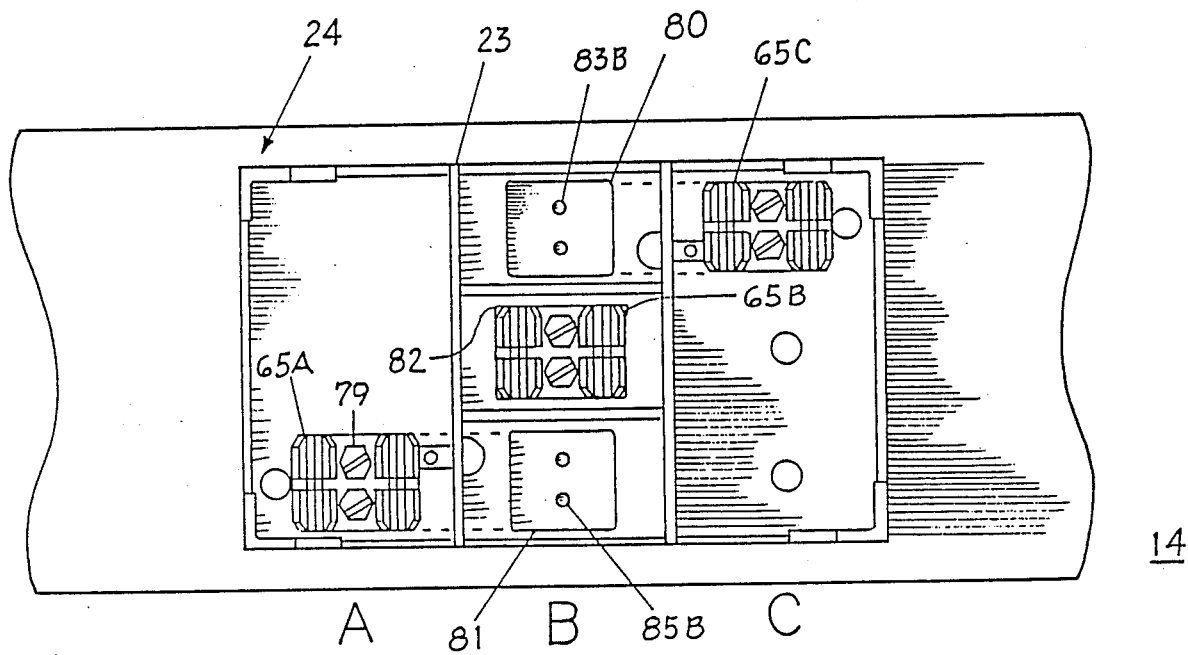
FIG. 7 is a bottom plan view of the electric switch-circuit breaker, module of FIG. 2.

The positioning of the connector clips on the bottom of the module 14 for a 3-phase electrical distribution interior is depicted in FIG. 7. The module base 24 contains three branch straps 80-82 separated by intervening isolation barriers 23 defining phase connector regions A, B, C, as indicated. The module is arranged for connection within a 3-phase electrical power distribution circuit wherein the connector clips 65A are attached to the line strap 81 by means of screws 79 and the remaining threaded apertures 85B on the branch, strap are not connected. A separate connector clip 65B is attached to the line strap 82 for connection within the B-phase. Connector clip 65C is attached to line strap 80 for connection with the C-phase while the threaded openings 83B are not connected.

Figure 8A:
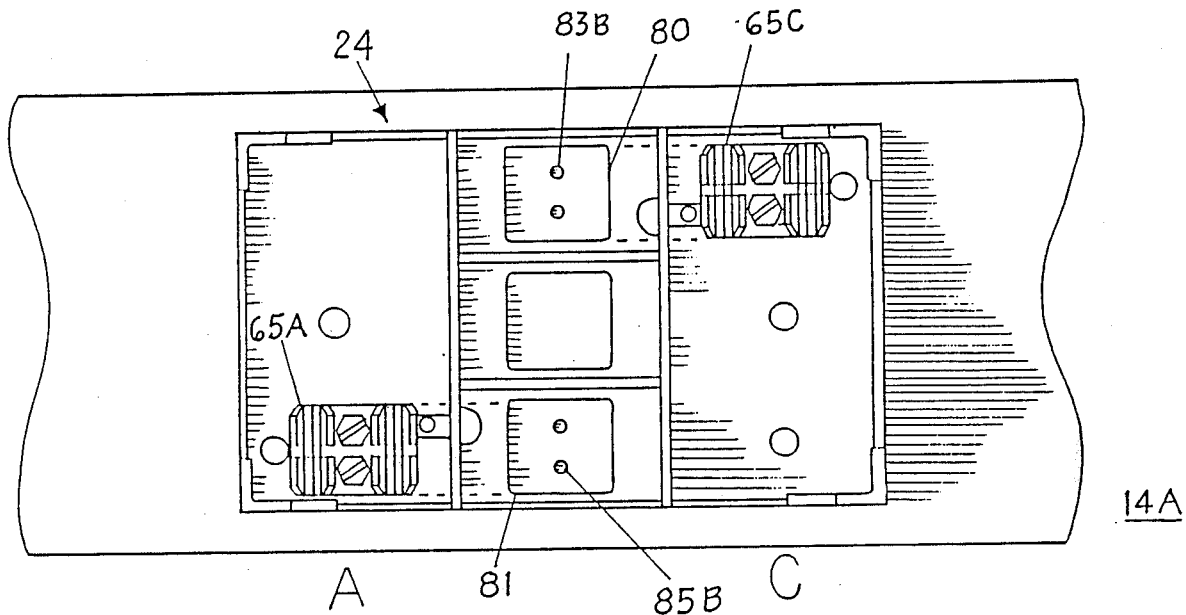
FIGS. 8A-8C are bottom plan views of the electric switch-circuit breaker module of FIG. 7 depicting various arrangements of the connector clips.
Figure 8B:
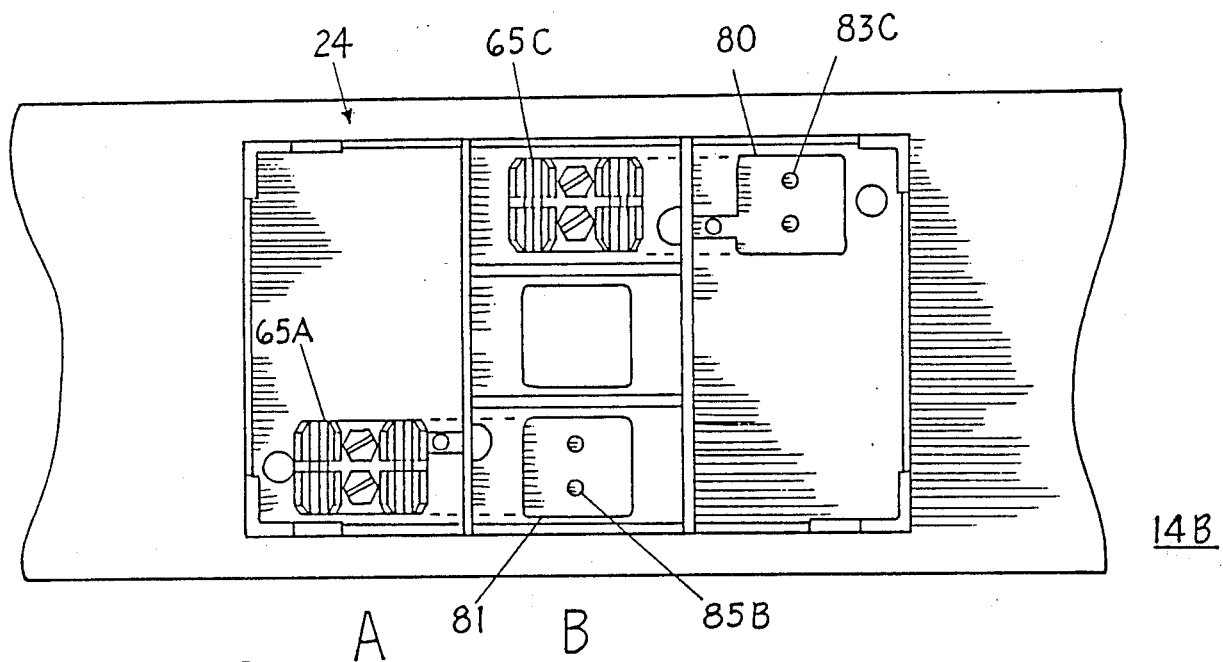
Figure 8C:
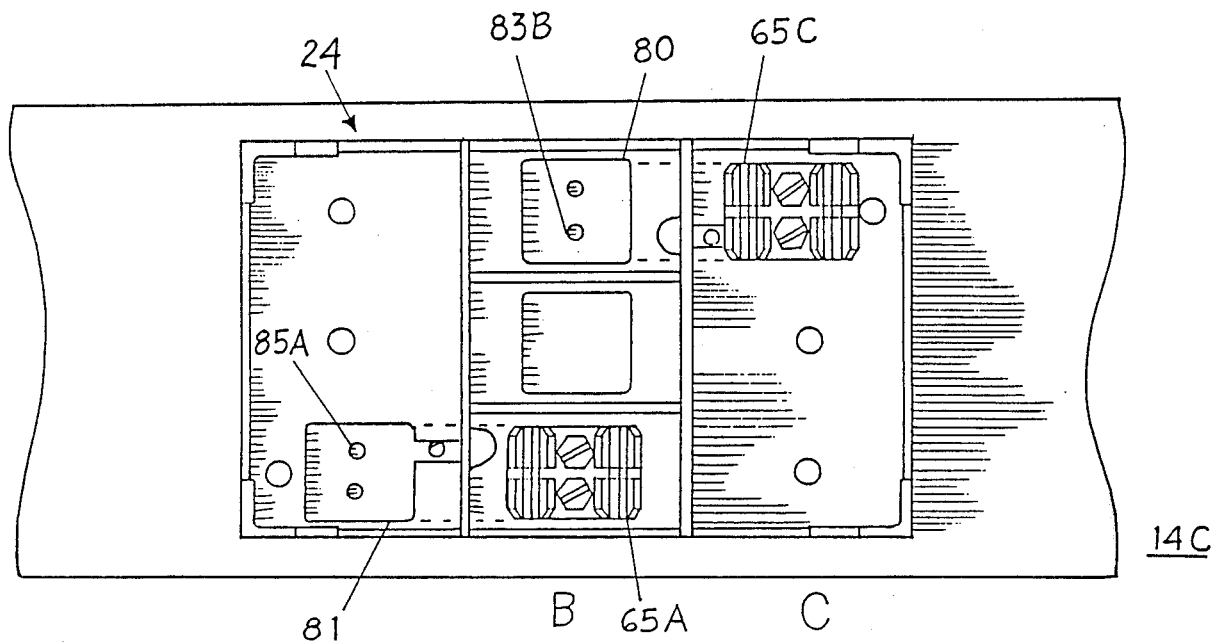

When a plurality of two pole modules are single phase-connected within a 3-phase electric power distribution circuit and wherein electrical connections are provided in the two outer poles of the module, "phase-balancing" is achieved in the manner best seen by referring now to FIGS. 8A-8C. The module base 24 within module 14A in FIG. 8A is arranged for connection within the A and C-phases by connecting the connector clip 65A to the branch strap 81 and leaving the threaded openings 85B unconnected. Connector clip 65C is connected to the branch strap 80 while the threaded openings 83B are not connected. The module base 24 in module 14B in FIG. 8B is arranged for connection with the A and B-phases by connecting the connector clip 65A to the branch strap 81 and leaving the threaded openings 85B unconnected. Connector clip 65C is connected to the branch strap 80 while the threaded openings 83C are not connected. The module base 24 in module 14C in FIG. 8C is adapted for connection with the B and C-phases by connecting the connector clip 65A to branch strap 81 and leaving the threaded openings 85A unconnected. Connector clip 65C is connected to branch strap 80 and the threaded openings 83B are not connected.

Figure 9:
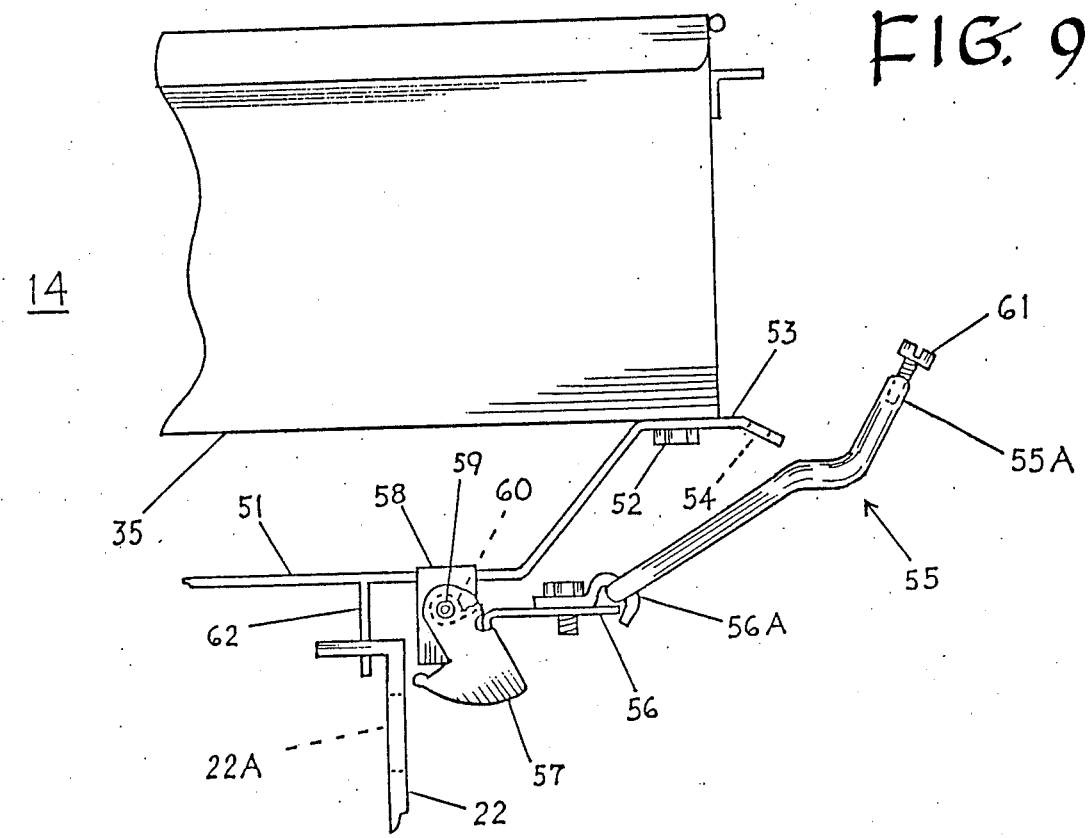
FIG. 9 is a side view representation of a part of the electric switch-circuit breaker module prior to attachment within the panelboard-switchboard interior.
Figure 10:
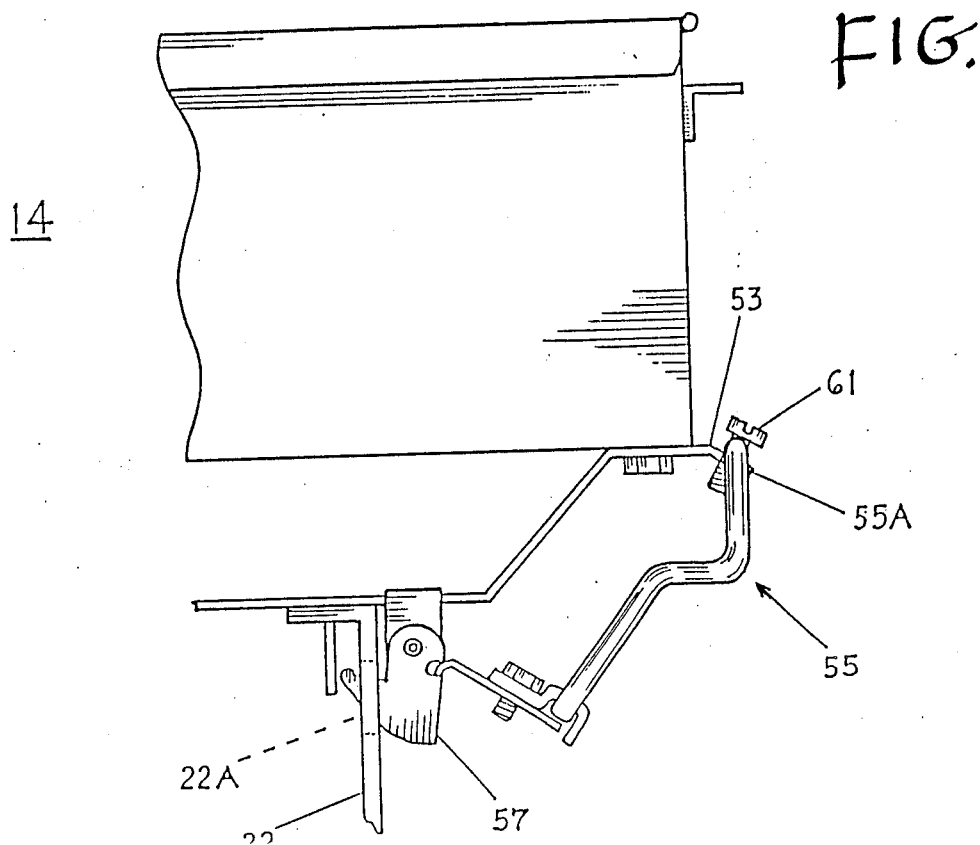
FIG. 10 is a side view representation of the electric switch-circuit breaker module of FIG. 8 after attachment within the panelboard-switchboard interior.

The latching arrangement between the module and the interior is best seen by now referring to FIGS. 9 and 10 wherein an angulated support plate 51 attached to the bottom 35 of the module 14 by means of bolts 52 supports a hook 57 that pivotally connects with a tab 58 by means of a pivot pin 59. A torsion spring 60 arranged around the pivot pin biases the hook in the direction of the guide extension 62 on the bottom of the support plate. A bail handle 55 is pivotally captured at one end within the circular end 56A of a connector plate 56 that is attached to the hook. The operative end 55A of the bail handle includes a screw 61 for cooperating with a thruhole 54 formed in the outward extension 53 of the support plate. In the unlatched condition depicted in FIG. 9, the hook 57 is away from the slot 22A formed within the end of the Z-shaped rail 22. In the latched condition of the module 14 depicted in FIG. 10, the hook 57 is captured within the slot 22A in the Z-shaped rail 22 and the screw 61 is fastened through the end 55A of the bail handle 55 and is threadingly engaged within the extension 53. In order to remove the module from the interior, the screw must first be disengaged from the threaded hole to allow operation of the bail handle to unlatch the hook from the slot.

Having thus described our invention, what we claim as new and desire to secure by Letters Patent is:

1. An electric switch-circuit breaker module comprising in combination:
   a pair of opposing sidewalls and endwalls joined by a continuous rear wall defining a rectangular enclosure open at a forward side thereof;
   a central partition intermediate and parallel to said endwalls separating said enclosure into first and second compartments;
   a pair of corresponding first and second compartment covers each hingeably attached to one of said endwalls;
   an insulative base attached to said rear wall and on the outside of said enclosure and communicating with said rear wall by means of an aperature therethrough;
   a plurality of connector clips extending from said insulative base, said connector clips each including an inner and outer off-set clip;
   an electric switch or circuit breaker within said first compartment, said second compartment being adapted for later receiving a field-installed electric switch or circuit breaker; and means arranged on said rear wall for attaching said enclosure to an electrically grounded panelboard or switchboard interior and for making electrical ground connection between said enclosure and said panelboard or switchboard interior.

2. The module of claim 1 wherein said attaching means includes a pair of hooks hingeably attached to said enclosure and a corresponding pair of locating plates extending from said enclosure inboard said hooks, said locating plates striking said grounded panelboard or switchboard interior before said connector clips engage bus bars within said interior.

3. The module of claim 2 including a pair of bail handles hingeably attached to said hooks at opposing ends of said enclosure, said bail handles including fastening means to prevent removal of said enclosure from said panelboard or switchboard interior.

4. module of claim 2 including a bracket attached to the rear wall of said enclosure, said bracket including an apertured extension arranged for accepting said fastening means.

5. The module of claim 4 wherein each said hook is attached to said bracket by a pivot pin and further includes a torsion spring arranged about said pivot pin thereby biasing said hook toward said locating plates.

6. The module of claim 1 wherein said partition comprises a pair of first and second off-set plates, a lanced tab extending from said first plate passing through a slot formed within said second plate.

7. The module of claim 6 wherein said partition means, further includes a lanced tab extending from said second plate extending through a slot formed within said first plate.

8. The module of claim 1 wherein said connector clips are attached by means of saddle-shaped springs.

9. The module of claim 8 wherein said inner clip includes a pair of legs off-set in a first direction and said outer clip includes a pair of legs off-set in a second direction opposite said first direction to thereby define corresponding first and second stab receiving spaces between said first and second legs.

10. The module of claim 9 wherein said first legs are joined by a first planar piece and said second legs are joined by a second planar piece, said, first and second planar pieces being apertured and receiving attachment means.

11. The module of claim 10 wherein said apertures within said first and second pieces align when said inner piece is positioned within said outer piece.

12. An electric switch-circuit breaker module comprising in combination:
a pair of opposing sidewalls and endwalls joined by a continuous rear wall defining a rectangular enclosure open at a forward side thereof;
a central partition intermediate and parallel to said endwalls separating said enclosure into first and second compartments;
a pair of corresponding first and second compartment doors each hingeably attached to one of said endwalls;
an insulative base attached to said rear wall and on the outside of said enclosure and communicating with said rear wall by means of an aperature therethrough;
a plurality of connector clips extending from inside said enclosure to the outside and through said insulative base;
an electric switch or circuit breaker within said first compartment, said second compartment being adapted for later receiving a field-installed electric switch or circuit breaker; and means arranged on said rear wall for attaching said enclosure to a panelboard-switchboard enclosure and for making electrical ground connection between said enclosure and said panelboard-switchboard enclosure.

13. The module of claim 12 wherein said attaching means includes a pair of hooks hingeably attached to said enclosure and a corresponding pair of locating plates extending from said enclosure inboard said hooks, said locating plates striking a[grounded panelboard or switchboard interior before said connector clips engage bus bars within said interior.

14. The module of claim 13 including a pair of bail handles hingeably attached to said hooks at opposing ends of said enclosure, said bail handles including means for removable attachment with said enclosure to thereby prevent removal of said enclosure from said panelboard or switchboard.

15. The module of claim 14 a bracket attached to a rear of said . said bracket including an apertured extension arranged for accepting said bail handle attaching means.

16. The module of claim 15 wherein each of said hooks is attached to said bracket by a pivot pin and wherein a torsion spring arranged about said pivot pin biases each of said hooks toward said locating plates.

17. The module of claim 12 wherein said partition means comprises a pair of first and second off-set plates a lanced tab extending from said first plate passing through a slot formed within said second plate.

18. The module of claim 17 including a lanced tab extending from said second plate extending through a slot formed within said first plate.

19. The module of claim 12 wherein said connector clips each include an inner and outer off-set clip joined together by a pair of springs.

20. The module of claim 19 wherein said springs comprise saddle-shaped springs.

21. The module of claim 19 wherein said inner clip includes a first pair of legs off-set in a first direction and said outer clip includes a second pair of legs off-set in a second direction opposite said first direction to thereby define corresponding first and second tab receiving spaces between said first and second legs.

22. The module of claim 21 wherein said first legs are joined by a first planar piece and said second legs are joined by a second planar piece, said first and second planar pieces being apertured for receiving attachment means.

23. The module of claim 21 wherein said apertures within said first and second pieces align when said inner piece is positioned within said outer piece.

24. The module of claim 12 including a plurality of insulative baffles extending from a bottom of said base intermediate said connector clips.

25. The module of claim 12 including three branch straps accessible through said base, said branch straps arranged for electrical connection with individual phases of a multi-phase electric power distribution system.

26. The module of claim 25 wherein one of said branch straps includes a pair of threaded openings separated by one of said baffles, whereby one of said threaded openings connects with one of said individual phases and the other of said threaded openings remains electrically disconnected.

27. The module of claim 26 wherein another of said branch straps includes a second pair of threaded openings separated by another of said baffles, whereby one of said second threaded openings connects with one of said individual phases and the other of said second threaded openings remains electrically disconnected.

* * * * *